United States Patent

Stewart et al.

[11] Patent Number: 5,132,079
[45] Date of Patent: Jul. 21, 1992

[54] OPTICAL FIBRE COUPLING DEVICE

[75] Inventors: William J. Stewart; Mark C. Farries, both of Northamptonshire, England

[73] Assignee: GEC-Marconi Limited, United Kingdom

[21] Appl. No.: 675,079

[22] Filed: Mar. 25, 1991

[30] Foreign Application Priority Data

Mar. 31, 1990 [GB] United Kingdom ............... 9007320

[51] Int. Cl.⁵ .................................. G02B 6/42
[52] U.S. Cl. ................................ 385/15; 385/33; 385/93
[58] Field of Search ............ 350/96.15, 96.16, 96.20; 385/15, 27, 33, 88, 90, 93

[56] References Cited

U.S. PATENT DOCUMENTS

| 4,834,492 | 5/1989 | Ishii et al. ............ 350/96.15 X |
| 4,919,506 | 4/1990 | Covey ................... 350/96.15 X |
| 4,955,014 | 9/1990 | Kuppers et al. ....... 350/96.15 X |
| 4,966,433 | 10/1990 | Blonder ............... 350/96.15 X |
| 5,018,820 | 5/1991 | Boudpeau et al. ..... 350/96.15 X |
| 5,044,717 | 9/1991 | LeVatter ................ 385/15 X |
| 5,046,809 | 9/1991 | Stein ...................... 385/15 X |

Primary Examiner—Akm E. Ullah
Assistant Examiner—Phan T. Heartney
Attorney, Agent, or Firm—Kirschstein, Ottinger, Israel & Schiffmiller

[57] ABSTRACT

An optical fibre coupling device comprises a mount 11 supporting an optical fibre waveguide having at a fibre end a surface of the fibre core 2 material which is surrounded by a body 3 of cladding material. At the core end a circular symmetric phase plate 7 is centered about the core 2 such that the light from a laser 1 entering or leaving the waveguide experiences a predetermined phase change. The phase change can act to reduce an optical coupling loss which occurs when the device is in use.

4 Claims, 6 Drawing Sheets

OPTICAL FIBRE COUPLING DEVICE

BACKGROUND OF THE INVENTION

1. Field of the Invention

This invention relates to an optical fibre coupling device.

2. Description of Related Art

In the coupling of laser light into a single-mode optical fibre it is important that losses in the transmitted light intensity should be kept low so that the total losses in a single-mode transmission system can be minimised. The launching of the light is usually effected from a single mode waveguide device such as a laser or amplifier and, whilst a perfect launching arrangement is theoretically possible, practical constraints usually limit the coupling efficiency to only about fifty percent, that is with a loss of more than three decibels (dB). Many real systems in practice will show losses as high as 5 dB.

Attempts have been made to improve the coupling efficiency by using lensing schemes which are intended to match the typically small and elliptically-shaped laser mode to a larger spot area requirement and a circular fibre mode. Thus, chemically etched conical microlenses have been disclosed in a paper by G. Eisenstein and D. Vitello in Applied Optics, Vol. 21, No. 19, Oct. 1, 1982, pp 3470 to 3474. However, these lens devices can still give high losses and the conical external shape may represent an unwanted feature. Losses are mainly due to the effect of a partial cancellation between different parts of the launch wave due to the existence of a phase mismatch in the wave.

This source of losses is capable of being corrected and the present invention was devised as a way of making this correction which enables certain difficulties in implementation to be avoided.

SUMMARY OF THE INVENTION

According to the invention, there is provided an optical fibre coupling device comprising an optical fibre waveguide having at a fibre end a surface of core material which is surrounded by a body of cladding material, in which at said core end a circular symmetric phase plate is centred about said core such that light entering or leaving said waveguide experiences a predetermined phase change.

The phase plate may be formed by a portion of the core material which projects by a particular axial distance beyond a level defined by the surface of the cladding material at the fibre end. In a different embodiment, the core material may be recessed by a particular axial distance below a level defined by the surface of the cladding material at the fibre end.

In a further embodiment, the phase plate is formed by an axially extended well in said cladding material which well has an annular shape and is located in a position where it surrounds the fibre core.

The well may be formed with a well floor of a non-planar shape so that this floor will define a partial Fresnel lens construction.

BRIEF DESCRIPTION OF THE DRAWINGS

By way of example, some particular embodiments of the invention will now be described with reference to the accompanying drawings, in which.

DETAILED DESCRIPTION OF THE PREFERRED EMBODIMENTS

Figure 1:
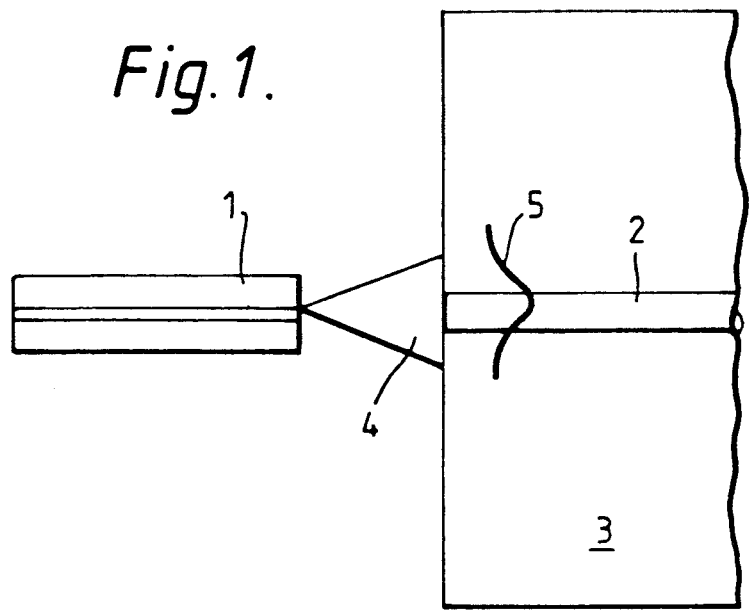
FIG. 1 is a sketch of a simple butt coupling arrangement of the prior art showing a waveguide device and an optical fibre on a greatly enlarged scale.

As shown in FIG. 1, an optical fibre coupling arrangement is formed when a waveguide device which is a laser 1 is directed towards an end of an optical fibre having a fibre core 2 which is surrounded by a body 3 of cladding material. Light from the laser 1 in a divergent beam 4 thus strikes the end of the fibre core 2, and a particular proportion of the laser 1 light output will thus be directed into the core 2 and along the optical fibre. The shape of the wave front entering the fibre is indicated by the curve 5.

This is a simple butt coupling arrangement and it will be apparent that the resulting coupling loss will be at a minimum value when the spacing distance between the laser 1 and core 2 is zero. As the spacing distance is increased by a few microns, there is another secondary minimum value which can occur. This secondary minimum reflects the growing cross-sectional area of the divergent beam as the distance increases and this factor enables a better size match to the cross-sectional area of the fibre core to be made. However, the phase fronts of the light entering the core will become curved with increasing distance, and the coupling losses can still remain high.

Figure 2:
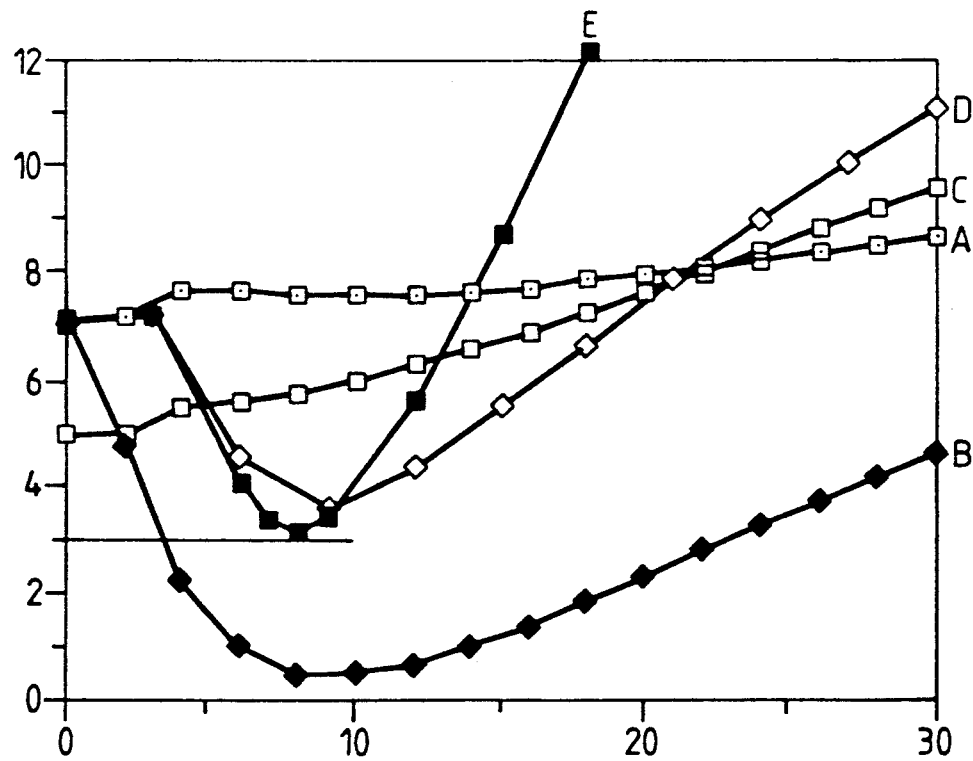
FIG. 2 is a graph depicting the transmission losses that can be expected with a variation in separation distance between the waveguide and the fibre core end.

The relationship between these variables is illustrated in the graph of FIG. 2 which shows on a vertical axis the Coupling Loss in decibels, against Spacing Distance in micrometers on the horizontal axis.

The values for the graph were calculated for a representative case of launch from a 1.5×3 micrometer spot waveguide launching into a nine micrometer spot size fibre, for a 1.5 micrometer wavelength of the light. Curve A gives the 'butt' loss whilst Curve B is the loss associated with use of an ideal lens as a coupling device. Curve C shows the loss when an intermediate fibre coupling device is used. The two remaining curves illustrate the effects of the present invention, Curve D using an axial well and Curve E using a ring well coupling device. The Curves D and E for the well constructions have been drawn to ignore the 2:1 asymmetry effect but this makes very little difference to the final result. All the curves have been drawn with the approximate assumption that Gaussian fields are present.

The graph also includes a horizontal line marking the position of a 3 dB coupling loss.

It might be reasonably assumed from this data that the use of a lens or lenses is an obvious solution to the coupling device problem. However, any lens used needs to be correctly aligned and this operation may be costly. The lens also needs to be of a high optical quality to avoid loss. The structure of the coupling device should additionally be small in size and capable of being assembled by automatic means. These conditions are difficult to fulfil but even when this is done correctly, the lens coupling device can still give losses of about 5 dB.

These losses are essentially due to the effect of a partial cancellation which can occur between different parts of the launch wave due to phase mismatch as already explained. Instead of using a lens, the present invention proposes an alternative way of reducing the mismatch by placing a blocking aperture of appropriate size in front of the fibre core.

Figure 3:
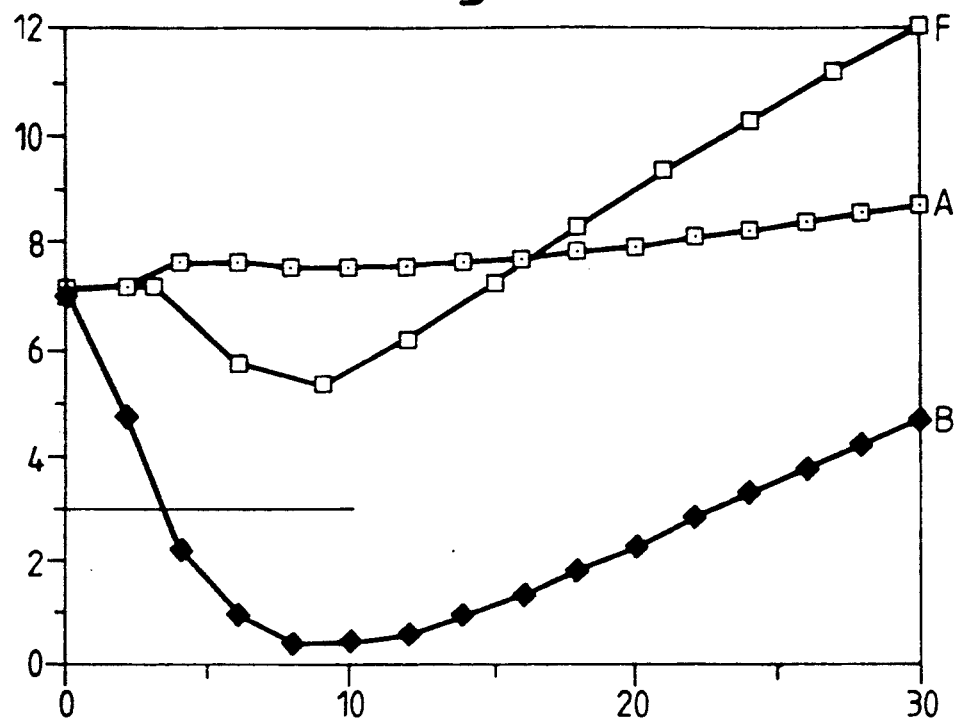
FIG. 3 is a further graph depicting the effect of placing a blocking aperture of appropriate size in front of the fibre core end.

FIG. 3 is a graph similar to that of FIG. 2 which shows the result of using such a blocking aperture instead of a lens. As before, Curve A gives the 'butt' loss whilst Curve B is the loss associated with an ideal lens. Curve F shows the loss associated with a blocking aperture. The loss in some cases is seen to be reduced by using the blocking aperture. The performance of the coupling device could be improved upon by correcting the phase every time it crosses $\pi$ and starts to cancel, but this improvement would require the use of a circular symmetric phase plate which is centred on the fibre end. FIG. 3 also includes a horizontal line marking the position of a 3 dB coupling loss.

Figure 4:
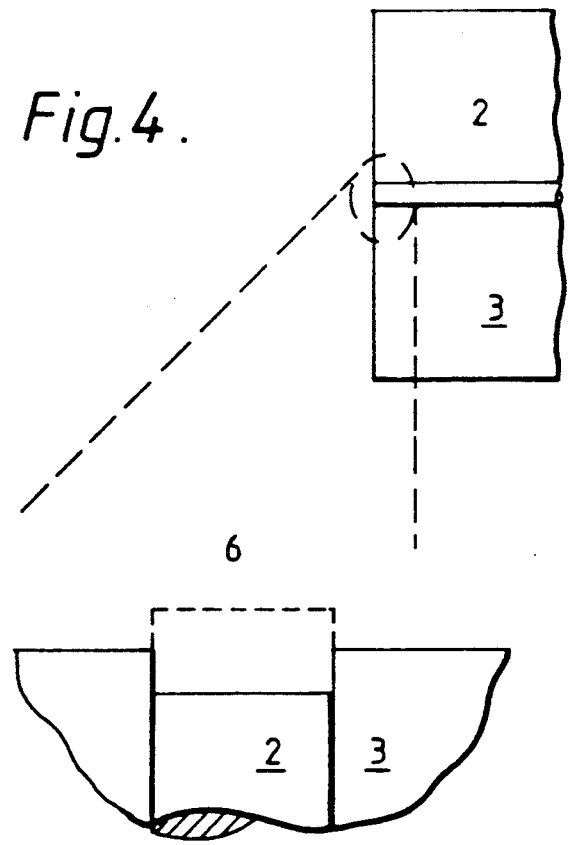
FIG. 4 is a sketch of one embodiment of coupling device of the present invention.

FIG. 4 in the upper part shows the end of an optical fibre with the core 2 surrounded by a body 3 of cladding material. The lower part of this Figure shows the core 2 end on a greatly enlarged scale and with the core longitudinal axis repositioned into a vertical attitude. By making use of a differential etch process, the end surface of the core 2 has been cut away so that this lies below a plane defined by the surface of the cladding material at the fibre end. The result of having the core region depressed by a distance of a half of the wavelength of the laser light (that is, about 1.5 micrometers) is to introduce a relative delay in the light entering the core. A similar delay would be introduced if the etching effect acted only on the cladding material of the fibre so that the core region will become raised by a distance of a half wavelength (as shown by the dotted line 6) above the plane of the cladding material end.

This practical construction where the end of the core material is displaced relative to that of the cladding material can be termed an 'axial well'. It might be thought that this construction is no more than an approximation to the shape of an optical lens but in fact the coupling effect is almost the same whether the core material is raised above or depressed below the plane of the cladding material end.

The performance of this axial well is shown by the Curve D in FIG. 2.

An alternative construction, that of the ring well, can be expected to give a slightly better performance (FIG. 2, Curve E) and this can be done by using a cladding material which has a readily etchable composition.

Figure 5:
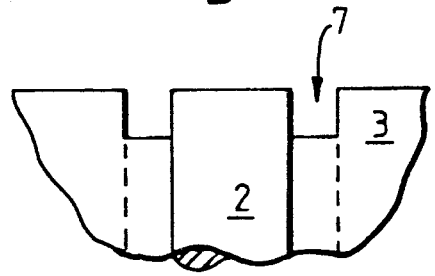
FIGS. 5 to 11 show additional embodiments.
Figure 6:
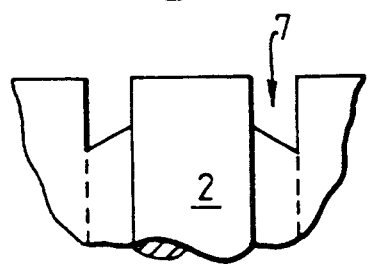
Figure 7:
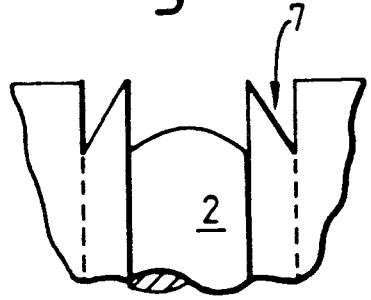

Examples of 'ring well' constructions are shown in FIGS. 5 to 7. These are arranged similarly to the optical fibre end depicted in FIG. 4 (lower part).

In FIG. 5, the body 3 of cladding material is formed with an inner portion in contact with the core 2 the material of which inner portion is more readily etched than the outer cladding material. The region of this inner cladding material can thus be readily etched so that it will form a ring well 7 located about the core 2. It will be noted that use of a ring well cannot be expected to improve on a 3 dB loss because the well acts as a diffractive zone plate that sends as much light 'out' as 'in', that is, it has as much a positive as a negative lens power.

The ring well construction can be modified by incorporating a blaze and thus a structure somewhat like a Fresnel lens/zone plate hybrid will be formed. Such a construction possibly will give improved results and examples are seen in FIGS. 6 and 7. The 'power' of the resulting Fresnel lens will be much less than would be expected from the focal length as shown and this factor will help to avoid the problem with curvature that has been already mentioned. The curve merely acts to bias the zone plate.

It will be seen in FIGS. 6 and 7 that the ring well 7 is formed with a well floor of a non-planar shape so that a partial Fresnel lens construction has been formed. In FIG. 7, the end of the fibre core 2 material has also been recessed by the etching operation and given a curved shape on its outer surface.

The FIGS. 6 and 7 embodiments could be readily fabricated by using special dopant profiles in the fibre manufacture. There is no necessary coincidence between the required zone plate dimensions and the size of the fibre core. It is not essential to use the specially fabricated fibres which have been mentioned because fibres can be made with differential etch rates independently from the arrangement of relative refractive indices.

In one series of experiments, an optical fibre having a single core doped with germania and a cladding of pure silica was used. Sample fibre ends were etched in a solution of hydrofluoric acid buffered in ammonium fluoride in a ratio of 1:7. This gave a core end in the shape of a protruding stud of simple form and somewhat graded. The etch time required was dependent on etching temperature and the fibre composition.

When using a 'Corning' (trade mark) single mode fibre end the etch time with the abovementioned solution was fifteen minutes at a temperature of 50° C. Under test, the minimum loss obtainable with this fibre end was found to be 2.7 dB.

In further experiments, a similar fibre end was etched in a solution of 55 milliliters nitric acid, 55 milliliters acetic acid, 25 milliliters milliliters hydrofluoric acid (40% in water) and 0.16 grams of iodine. This solution produced a graded profile.

Whichever etching solution had been used, the grading effect was found to be produced by a combination of differential etch rates with a relevant graded composition of the fibre. A particular etching process was found to have its own smoothing characteristics.

Etching trials with other etchants and fibres appeared to indicate that the use of boria (refractive index reducing) and phosphoria (refractive index increasing) doping, in conjunction with germania would allow a close and independent control of index and etched profile. The boria and phosphoria dopants are both generally etch rate increasing with high differential rates, although this factor depends upon the particular etchant which is used.

FIGS. 8 to 11 show further profiles of core ends which have been shaped to provide the circular symmetric phase plate construction of the invention. Each of the FIGS. 8 to 11 represents the cross-sections (after etching) of the core region only, without any cladding material being present. These shapes can be considered in conjunction with the graph of FIG. 12 which shows on the vertical axis the Coupling Loss in decibels against a profile type as denoted by the characters P to U on the horizontal axis. The FIG. 12 curve was determined for a fibre having a core radius of 3.5 micrometers. Values for core radii having other dimensions would differ slightly but the overall trends would be expected to be similar.

Since the selected shape of the core end contributes in some degree to the correction of the phase errors in the launch process it is relevant to coupling losses obtained with different core end profiles.

Figure 12:
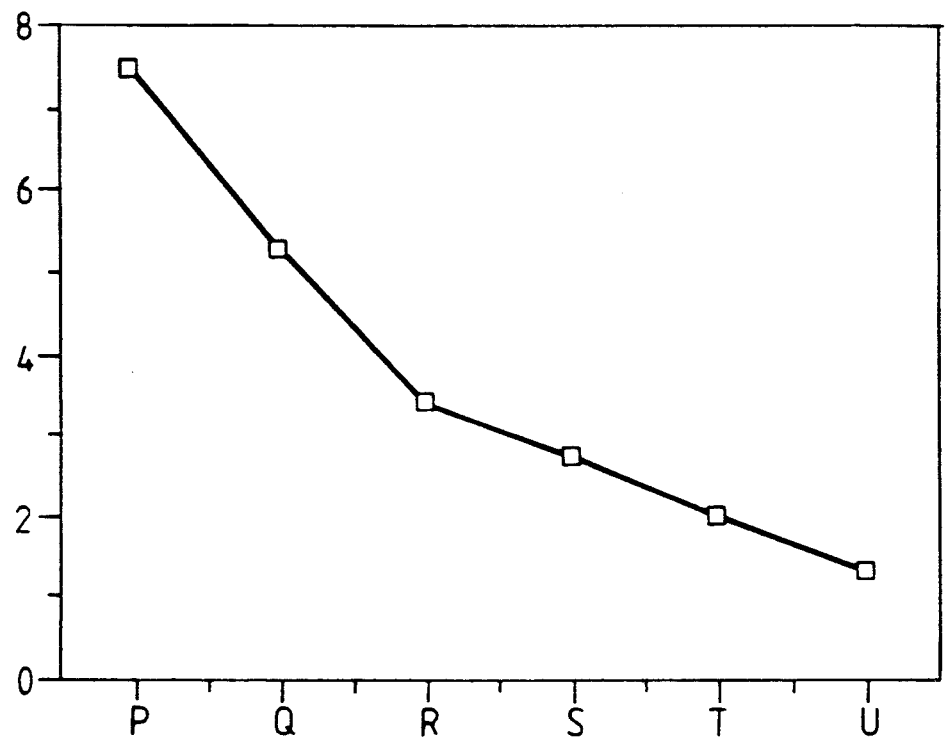
FIG. 12 is a graph showing the transmission losses for various shapes of the core material end.

In FIG. 12, the values for Coupling Loss were obtained by calculation and, as a start, the profile type P is that for a simple butt coupling where the fibre core has an unformed shape. An improvement of almost three dB is effected by using a blocking aperture, profile type Q. A further reduction in loss is made when the core end is given the simple hat shape of FIG. 10, and this construction corresponds to profile type R.

Figure 8:
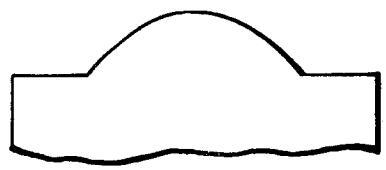
Figure 9:
Figure 10:
Figure 11:
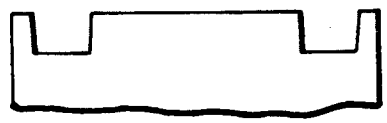

An additional improvement is seen when the core end has a double well shaping as depicted in FIG. 11, this corresponds to the profile type S. A simple lens shaping as shown in FIG. 8 gives the coupling loss of profile type T. A lens/well shaping as shown in FIG. 9 gives the coupling loss of profile type U.

Figure 13:
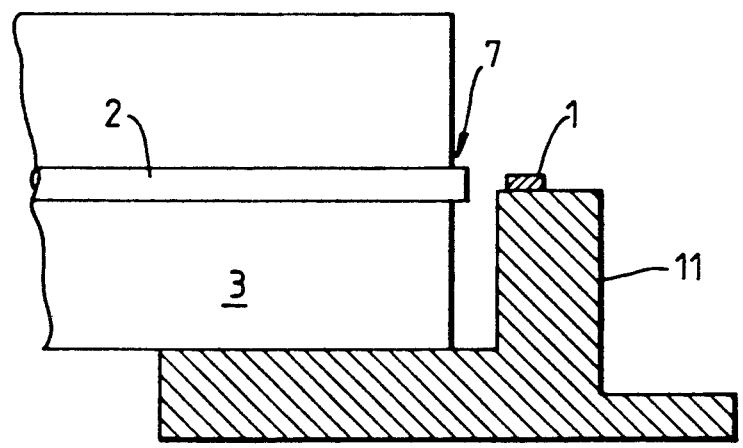
FIG. 13 is a sketch of a complete optical fibre coupling device.

A complete construction of an optical fibre coupling device is shown in FIG. 13. The device comprises a mount 11 which supports an optical fibre having a fibre core 2 and body 3 of cladding material. The mount 11 additionally supports a laser 1 which is maintained at a predetermined distance from the fibre end and in a position where its light output can be fed directly into the end of the core 2. The end of the optical fibre carries the phase plate 7 structure of the invention.

The construction of the coupling device of the invention has been found to be simple to implement and fabrication can be effected by a mass production operation. The 'zone plate' feature is designed to be self-aligning on the fibre core and it offers low coupling losses.

Figure 14:
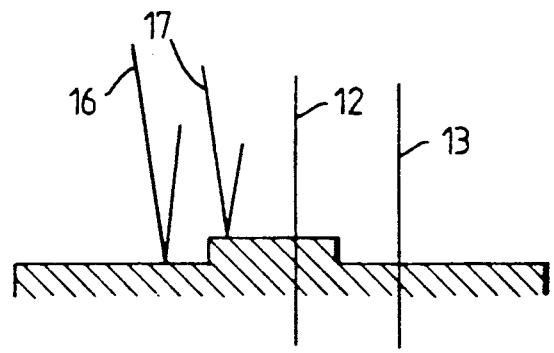
FIG. 14 shows some possible paths for light beams travelling through the fibre core end face, and, FIG. 15 is a graph showing the reflection loss from a fibre end into a laser waveguide for various simple phase plate types.

The same technique as that proposed to enhance the coupling efficiency can also be used to reduce the reflectivity of the fibre end face as seen by the laser/waveguide. There is no absolute reduction in reflectivity, but the cancellation effect can result in less light being coupled back into the waveguide. This effect could also reduce the reflection back into the fibre from the end. The effect on reflectivity arises because the physical shape of the phase plate also affects the differential phase of light in (in the case of the simple hat/stud profile) the cladding and core regions. This effect is different from the transmission effect because the two paths are different. Some of the possible light paths are shown in FIG. 14. These are:

*Transmission* through the elevated glass stud, and through the air around it (FIG. 14, light paths 12 and 13), differing because of the glass refractive index.

*Reflection* twice through the air around the stud. (FIG. 14, light paths 16 and 17), different for geometrical reasons; internal reflection (from below) would be different because of the glass refractive index.

Clearly, it will in general be true that the best shape for a reflection reduction will be different from that for transmission maximisation. The present invention includes the choice of optimum shape for either. For the most part the optimisation involved is on the height of the stud. It happens fortuitously that one can get both conditions near to optimum with a single shape for typical fibres.

Figure 15:
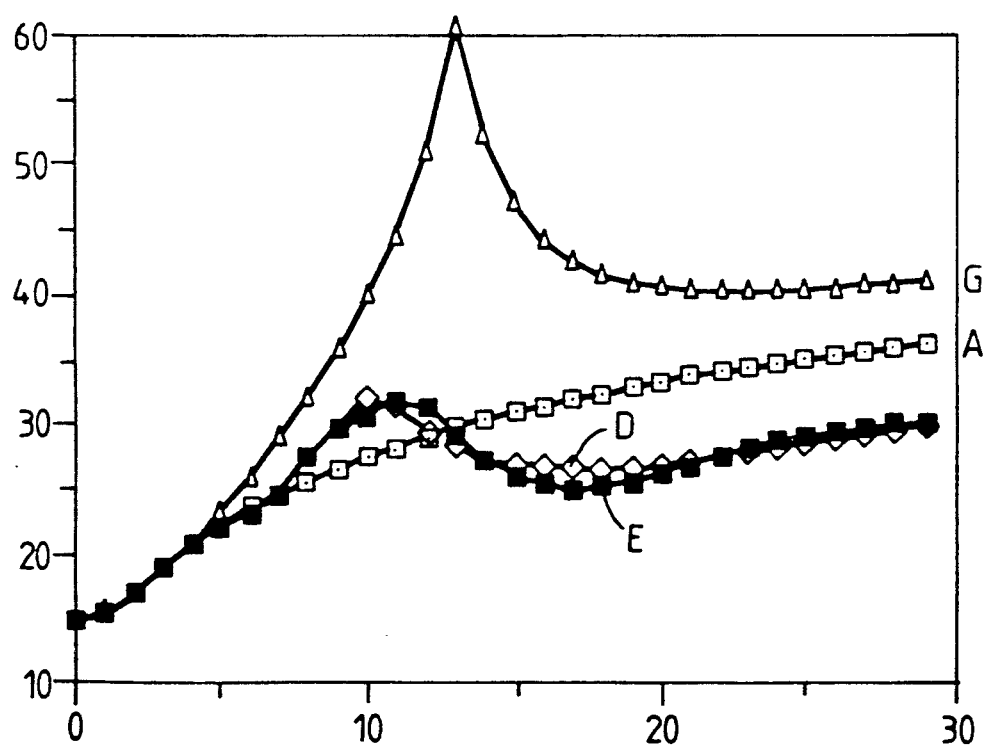

FIG. 15 is a graph showing the reflection loss from a fibre end into a laser waveguide for various simple phase plate types. The vertical axis depicts the Reflection Loss in units of negative decibels against minimum loss in micrometers on the horizontal axis. The graph thus shows the reflection loss for the path waveguide/fibre end/waveguide ignoring reflection effects at the waveguide end.

The symbols for the reflection curves correspond to those given in FIG. 2. Thus curve A gives the 'butt' reflection for a plane fibre core end. Curve D shows a simple stud optimised for loss, whilst Curve E is for the ring well construction. The Curve G shows the result with a simple stud optimised for low reflectivity.

The graph shows the reflectivity of a plane glass surface (about −14 dB).

The Curve A indicates the performance of an untreated end, and it can be seen that the etched ends can be worse (higher reflectivity) as well as better. A gain of about five decibels for the minimum loss of about ten micrometers seems reasonable, but ends optimised for low reflection show much greater improvements.

The foregoing descriptions of embodiments of the invention have been given by way of example only and a number of modifications may be made without departing from the scope of the invention as defined in the appended claims. For example, the spacing between the laser and the fibre end is normally about ten micrometers. However, the optimum spacing will be found to vary somewhat according to the particular shape required to be applied to the fibre core end.

We claim:

1. An optical fibre coupling device, comprising an optical fibre waveguide having at a fibre end a surface of core material which is surrounded by a body of cladding material, in which at said core end a circular symmetric phase plate is centered about said core material such that light entering or leaving said waveguide experiences a predetermined phase change, and wherein said phase plate is provided by a recess extending into at least one of said cladding material and said core material from the fibre end to a particular axial distance below a plane defined by the outer edge at the surface of cladding material at the fibre end.

2. A coupling device as claimed in claim 1, in which said phase plate is formed by an axially extended well in said cladding material, said well having an annular shape and being located in a position where it surrounds said core material.

3. A coupling device as claimed in claim 2, in which said well is formed with a well floor of a non-planar shape so as to define a partial Fresnel lens construction.

4. A coupling device as claimed in claim 1, in which said recess is formed by etching at least one of said materials from the fibre end.

* * * * *